(12) United States Patent
Lindenmeier et al.

(10) Patent No.: US 10,767,514 B2
(45) Date of Patent: Sep. 8, 2020

(54) WASTE-HEAT UTILIZATION ASSEMBLY OF AN INTERNAL COMBUSTION ENGINE, AND METHOD FOR OPERATING THE WASTE-HEAT UTILIZATION ASSEMBLY

(71) Applicant: Robert Bosch GmbH, Stuttgart (DE)

(72) Inventors: Derya Lindenmeier, Rutesheim (DE); Gregory Rewers, Schwieberdingen (DE); Michael Richter, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 16/301,151

(22) PCT Filed: Apr. 12, 2017

(86) PCT No.: PCT/EP2017/058783
§ 371 (c)(1),
(2) Date: Nov. 13, 2018

(87) PCT Pub. No.: WO2017/194259
PCT Pub. Date: Nov. 16, 2017

(65) Prior Publication Data
US 2019/0203615 A1     Jul. 4, 2019

(30) Foreign Application Priority Data
May 10, 2016   (DE) .................. 10 2016 207 978

(51) Int. Cl.
*F01K 23/06*   (2006.01)
*F01K 13/00*   (2006.01)
(Continued)

(52) U.S. Cl.
CPC .......... *F01K 23/065* (2013.01); *F01K 13/003* (2013.01); *F01K 13/02* (2013.01);
(Continued)

(58) Field of Classification Search
CPC ...... F01K 23/065; F01K 13/003; F01K 13/02; F01P 3/20; F01P 2060/14; F02G 5/02;
(Continued)

(56) References Cited

U.S. PATENT DOCUMENTS

| 8,739,531 B2* | 6/2014 | Teng ..................... F01K 23/065 60/618 |
| 9,551,240 B2* | 1/2017 | Son ....................... F01K 23/065 |

(Continued)

FOREIGN PATENT DOCUMENTS

| CN | 202851187   | 4/2013 |
| DE | 102015201495 | 8/2015 |

(Continued)

OTHER PUBLICATIONS

An English machine translation copy to Hirao et al. (Pub. No. JP 2008-03916 A), published on Feb. 21, 2008.*

(Continued)

*Primary Examiner* — Thai Ba Trieu
(74) *Attorney, Agent, or Firm* — Michael Best & Friedrich LLP

(57) ABSTRACT

The invention relates to a waste-heat utilization assembly (1) of an internal combustion engine (50), comprising a working circuit (2) that conducts a working fluid. The working circuit (2) is equipped with a feed pump (6), an evaporator (10), an expansion machine (3) and a condenser (4) in the direction of flow of the working fluid. Additionally, the evaporator (10) is also arranged in an exhaust tract (53) of the internal combustion engine (50). The exhaust tract (53) is equipped with an exhaust bypass channel (61) parallel to the evaporator (10), and the exhaust tract (53) is equipped with an exhaust bypass valve (60), by means of which the distribution of the mass flow rate of the exhaust of the internal combustion engine (50) to the evaporator (10) and to the (Continued)

exhaust bypass channel (61) can be controlled. The waste-heat utilization assembly (1) further comprises a cooling device (20, 40, 30) which conducts a coolant, and the condenser (4) is arranged in the cooling device (20, 40, 30). Furthermore, at least one temperature sensor (37, 38, 41, 42, 43, 44) is arranged in the cooling device (20, 40, 30).

17 Claims, 4 Drawing Sheets

(51) Int. Cl.
| | | |
|---|---|---|
| *F01K 13/02* | (2006.01) | |
| *F01K 23/10* | (2006.01) | |
| *F01N 5/02* | (2006.01) | |
| *F01P 3/20* | (2006.01) | |
| *F02G 5/02* | (2006.01) | |

(52) U.S. Cl.
CPC ............. *F01K 23/10* (2013.01); *F01N 5/02* (2013.01); *F01P 3/20* (2013.01); *F02G 5/02* (2013.01); *F01N 2240/02* (2013.01); *F01N 2390/00* (2013.01); *F01N 2410/02* (2013.01); *F01N 2900/08* (2013.01); *F01P 2060/14* (2013.01); *Y02T 10/16* (2013.01); *Y02T 10/166* (2013.01)

(58) Field of Classification Search
CPC .... F01N 5/02; F01N 2240/02; F01N 2390/00; F01N 2410/02; F01N 2900/08; Y02T 10/16; Y02T 10/166
USPC .................................................. 60/616–618
See application file for complete search history.

(56) References Cited

U.S. PATENT DOCUMENTS

| | | | |
|---|---|---|---|
| 9,587,546 B2* | 3/2017 | Hussain | F01N 5/02 |
| 9,670,836 B2* | 6/2017 | Carstensen | F01K 23/065 |
| 10,047,638 B2* | 8/2018 | Adachi | F01K 23/10 |
| 2011/0041505 A1 | 2/2011 | Kasuya et al. | |
| 2012/0198839 A1* | 8/2012 | Nelson | F01K 23/065 60/605.1 |
| 2015/0013328 A1* | 1/2015 | Carstensen | F01K 23/065 60/597 |
| 2015/0184551 A1* | 7/2015 | Son | F01K 23/065 60/597 |
| 2015/0218998 A1 | 8/2015 | Ishihata et al. | |
| 2016/0138429 A1* | 5/2016 | Son | F01K 23/065 60/645 |
| 2016/0138430 A1* | 5/2016 | Son | F01K 23/10 60/618 |
| 2016/0230643 A1* | 8/2016 | Honda | F01K 23/10 |
| 2016/0298497 A1* | 10/2016 | Adachi | F01K 15/045 |
| 2018/0094574 A1* | 4/2018 | Takahashi | F01P 3/22 |
| 2018/0202311 A1* | 7/2018 | Neunteufl | F01K 23/065 |
| 2018/0230860 A1* | 8/2018 | Maier | F01K 23/065 |
| 2019/0093537 A1* | 3/2019 | Grelet | F01K 23/065 |

FOREIGN PATENT DOCUMENTS

| | | | | |
|---|---|---|---|---|
| DE | 102015214728 | | 2/2017 | |
| JP | 2008038916 | | 2/2008 | |
| WO | 2012115572 | | 8/2012 | |
| WO | 2013028173 | | 2/2013 | |
| WO | 2016089276 | | 6/2016 | |
| WO | 2017021034 | | 2/2017 | |
| WO | WO-2017021033 A1 * | | 2/2017 | .......... F01K 23/065 |
| WO | 2017105480 | | 6/2017 | |

OTHER PUBLICATIONS

An English machine translation copy to Fan et al. (Pub. No. CN 202851187 U), published on Apr. 3, 2013.*
International Search Report for Application No. PCT/EP2017/058783 dated Jul. 7, 2017 (English Translation, 3 pages).

* cited by examiner

WASTE-HEAT UTILIZATION ASSEMBLY OF AN INTERNAL COMBUSTION ENGINE, AND METHOD FOR OPERATING THE WASTE-HEAT UTILIZATION ASSEMBLY

BACKGROUND OF THE INVENTION

The invention concerns a waste-heat utilization assembly of an internal combustion engine, and a method for operating the waste-heat utilization assembly.

Waste-heat utilization assemblies of internal combustion engines are known from the prior art, such as for example publication WO 2013/028173 A1. The known waste-heat utilization assembly of an internal combustion engine comprises a working circuit conducting a working medium, wherein in the flow direction of the working medium, a feed pump, an evaporator, an expansion machine and a condenser are arranged in the working circuit. The evaporator is also arranged in an exhaust gas tract of the internal combustion engine. Furthermore, an exhaust gas bypass channel for bypassing the evaporator is arranged in the exhaust gas tract. The known waste-heat utilization assembly also comprises a cooling circuit.

In the known waste-heat utilization assembly, however, there is no control or regulation of the temperature in the cooling circuit. As a result, there is a risk of overloading the components of the cooling circuit, and consequently also of the working circuit.

SUMMARY OF THE INVENTION

The waste-heat utilization assembly of an internal combustion engine according to the invention, in contrast, has the advantage that the cooling circuit or a cooling device is controlled or regulated via a temperature sensor. This extends the service life, in particular of the components of the cooling device. Furthermore, the efficiency of the waste-heat utilization assembly is also increased.

For this, the waste-heat utilization assembly comprises a working circuit conducting a working medium, wherein in the flow direction of the working medium, a feed pump, an evaporator, an expansion machine and a condenser are arranged in the working circuit. The evaporator is also arranged in an exhaust gas tract of the internal combustion engine. An exhaust gas bypass channel is arranged in the exhaust gas tract parallel to the evaporator, wherein an exhaust gas bypass valve is arranged in the exhaust gas tract. The distribution of the mass flow of the exhaust gas of the internal combustion engine to the evaporator and to the exhaust gas bypass channel can be controlled by the exhaust gas bypass valve. The waste-heat utilization assembly furthermore comprises a cooling device conducting a coolant. The condenser is arranged in the cooling device. In addition, at least one temperature sensor is arranged in the cooling device.

In this way, the exhaust gas mass flow can be distributed to the evaporator and to the exhaust gas bypass channel depending on the temperature determined by the temperature sensor. A temperature rise in the cooling device beyond a limit value is thus avoided. The service life of the entire waste-heat utilization assembly, in particular of the components of the cooling device, is thus extended. In addition, a safer operation of the waste-heat utilization assembly is guaranteed, since this also avoids overheating of the working circuit. The distribution of the exhaust gas mass flow to the evaporator and to the exhaust gas bypass channel is easily controlled by the exhaust gas bypass valve. A very rapid and efficient temperature regulation of the cooling device, and hence also indirectly of the working circuit, can thus be achieved by actuating the exhaust gas bypass valve.

Advantageously, the exhaust gas bypass valve is configured as a proportional valve. When configured as a proportional valve, the heat quantity can be dissipated to the evaporator as desired. This achieves the greatest possible power output to the expansion machine without overheating the cooling circuit. Negative interactions between the working circuit and the cooling device are thus avoided.

In an advantageous refinement, the cooling device comprises a cooling circuit with a coolant pump and a cooler. The coolant may be a liquid coolant. In this way, very high heat transfer coefficients can be achieved, and the cooling of the condenser is consequently very effective. Excellent cooling performance can be achieved.

If the temperature in the cooling circuit rises above the limit value, the heat quantity transferred to the cooling circuit via the condenser is reduced by actuating the exhaust gas bypass valve, so that less exhaust gas heat is conducted to the evaporator. Consequently, a smaller heat quantity is transferred by the evaporator to the working circuit, whereby also a smaller heat quantity enters the cooling circuit via the condenser. The temperature in the cooling circuit can thus be reduced below the limit value again.

In order to limit the temperature rise in the cooling circuit, when defined temperature limit values are exceeded, the exhaust gas is conducted into the exhaust gas bypass channel such that the entire exhaust gas mass flow, or at least part of the available exhaust gas mass flow, is conducted past the evaporator.

In an advantageous refinement, the internal combustion engine is arranged in the cooling circuit. In this way, the waste-heat utilization assembly does not require a separate cooling circuit. Alternatively, only individual components of the cooling circuit may be used both for cooling the internal combustion engine and for cooling the condenser. In both cases, it is very important that the temperature of the cooling circuit does not rise above the limit value, else the internal combustion engine can no longer be effectively cooled. In unfavorable cases, the power of the internal combustion engine would then have to be reduced.

In advantageous embodiments, the temperature sensor is arranged upstream of the condenser in the cooling circuit, and a further temperature sensor is arranged downstream of the condenser. In alternative embodiments, also only one temperature sensor may be arranged either upstream or downstream of the condenser. In this way, with a known mass flow of coolant, the heat quantity transmitted to the cooling circuit via the condenser can be determined. A control unit can thus determine the time period required until the limit value for the cooling circuit temperature is reached. Accordingly, the exhaust gas bypass valve can be actuated in good time, in order to open the exhaust gas bypass channel and thus prevent overheating of the cooling circuit.

In advantageous refinements, the cooler is furthermore arranged in a cooler air path. Here, the cooler air path comprises an additional temperature sensor. In this way, the air temperature at the cooler may be monitored as an indication of the heat quantity emerging from the cooling circuit at the cooler. The additional temperature sensor is preferably arranged downstream of the cooler. If the temperature measured there exceeds a maximum air temperature, the exhaust gas bypass valve is actuated accordingly so that it chokes or stops the exhaust gas mass flow to the evaporator.

In an alternative advantageous embodiment, the cooling device has a cooler air path with a cooler. The coolant here is preferably air. In this way, the cooling of the condenser or waste-heat utilization assembly is configured very compactly. Advantageously, the condenser and cooler may be designed as one assembly, for example also in a common housing.

Advantageously, the temperature sensor is arranged upstream of the condenser in the cooler air path, and/or a further temperature sensor is arranged downstream of the condenser. In this way, with a known mass flow of coolant, the heat quantity transmitted to the cooler air path via the condenser can be determined. A control unit can thus determine the time period required until the limit value for the cooler air path temperature is reached. Accordingly, the exhaust gas bypass valve can be actuated in good time, in order to open the exhaust gas bypass channel and thus prevent overheating of the cooler air path and then the condenser.

Further methods for operating the waste-heat utilization assembly of the internal combustion engine are described below; these comprise regulation or control of the temperature of the working circuit, in particular of the cooling circuit or cooler air path.

The method according to the invention for operating a waste-heat utilization assembly of an internal combustion engine comprises a working circuit conducting a working medium, wherein in the flow direction of the working medium, a feed pump, an evaporator, an expansion machine and a condenser are arranged in the working circuit. The evaporator is also arranged in an exhaust gas tract of the internal combustion engine, wherein an exhaust gas bypass channel is arranged in the exhaust gas tract parallel to the evaporator. An exhaust gas bypass valve distributes the exhaust gas mass flow to the evaporator and to the exhaust gas bypass channel. The waste-heat utilization assembly furthermore comprises a cooling device conducting a coolant. The condenser and a temperature sensor are arranged in the cooling device. According to the invention, the exhaust gas bypass valve is controlled by a control unit such that a maximum temperature is not exceeded at the temperature sensor.

The temperature sensor transmits signals to the control unit. If the latter thus establishes that the maximum temperature has been exceeded, the exhaust gas mass flow to the evaporator is accordingly choked or even stopped.

In this way, the control unit regulates the temperature in the cooling device so that the maximum temperature is not exceeded. In this way, firstly, the stability of the coolant itself is guaranteed. Secondly, the temperature loads on the components of the cooling device are not too high. Furthermore, the waste-heat utilization assembly and the internal combustion engine can thus be operated particularly efficiently.

In an advantageous embodiment of the method, a map stored in the control unit for the internal combustion engine is used to actuate the exhaust gas bypass valve. In this way, the exhaust gas bypass valve can be controlled easily. In some cases, there is even no need to arrange sensors, in particular multiple temperature sensors, in the working circuit and in the cooling device.

In advantageous refinements of the assembly, the cooling device comprises a cooler air path with a cooler. The condenser and the temperature sensor are consequently arranged in the cooler air path. This ensures a particularly compact design of the cooling of the waste-heat utilization assembly, in particular the condenser. The measured temperature of the cooler air is accordingly used as an indicator for possible overheating of the working circuit. The control unit actuates the exhaust gas bypass valve as a function of the temperature of the cooler air. If this air temperature exceeds a maximum temperature, the exhaust gas bypass valve is actuated accordingly so that it chokes or stops the exhaust gas mass flow to the evaporator.

In alternative advantageous refinements of the assembly, the cooling device comprises a cooling circuit with a coolant pump and a cooler. Accordingly, the condenser and the temperature sensor are arranged in the cooling circuit. This ensures an efficient cooling of the waste-heat utilization assembly via the coolant. The measured temperature of the coolant is used accordingly as an indicator for a possible overheating of the working circuit or cooling circuit.

Advantageously, the cooler is furthermore arranged in a cooler air path. The cooler air path comprises an additional temperature sensor, wherein the additional temperature sensor transmits signals to the control unit. The control unit controls the exhaust gas bypass valve as a function of these signals. From the signals, the control unit determines an air temperature in the cooler air path. If the air temperature exceeds a maximum air temperature, the exhaust gas bypass valve is actuated accordingly so that it chokes or stops the exhaust gas mass flow to the evaporator.

In advantageous embodiments, the cooler has a fan wheel. The control unit detects a rotation of the fan wheel, for example by a rotation speed meter. The exhaust gas bypass valve is actuated by the control unit as a function of the rotation of the fan wheel. For this, for example, a map for rotation of the fan wheel may be used as a measure of the cooling power of the cooler to be supplied for the operating states of the internal combustion engine and waste-heat utilization assembly. If the cooling power to be supplied is too high, i.e. above a cooling power limit value, the heat supplied from the condenser to the cooling circuit is reduced by reducing the heat supplied from the evaporator to the working circuit. For this, the exhaust gas mass flow into the evaporator is reduced by corresponding actuation of the exhaust gas bypass valve.

In advantageous refinements, a temperature sensor is installed in the working circuit, preferably between the evaporator and the expansion machine. Thus the control unit, which receives signals from the temperature sensor, can monitor the maximum temperature of the working medium in the working circuit. This monitoring takes place in addition to the monitoring of the temperature of the coolant in the cooling device. This ensures an even faster and more targeted response to overheating of the working or cooling circuit or cooler air path.

DETAILED DESCRIPTION

Figure 1:
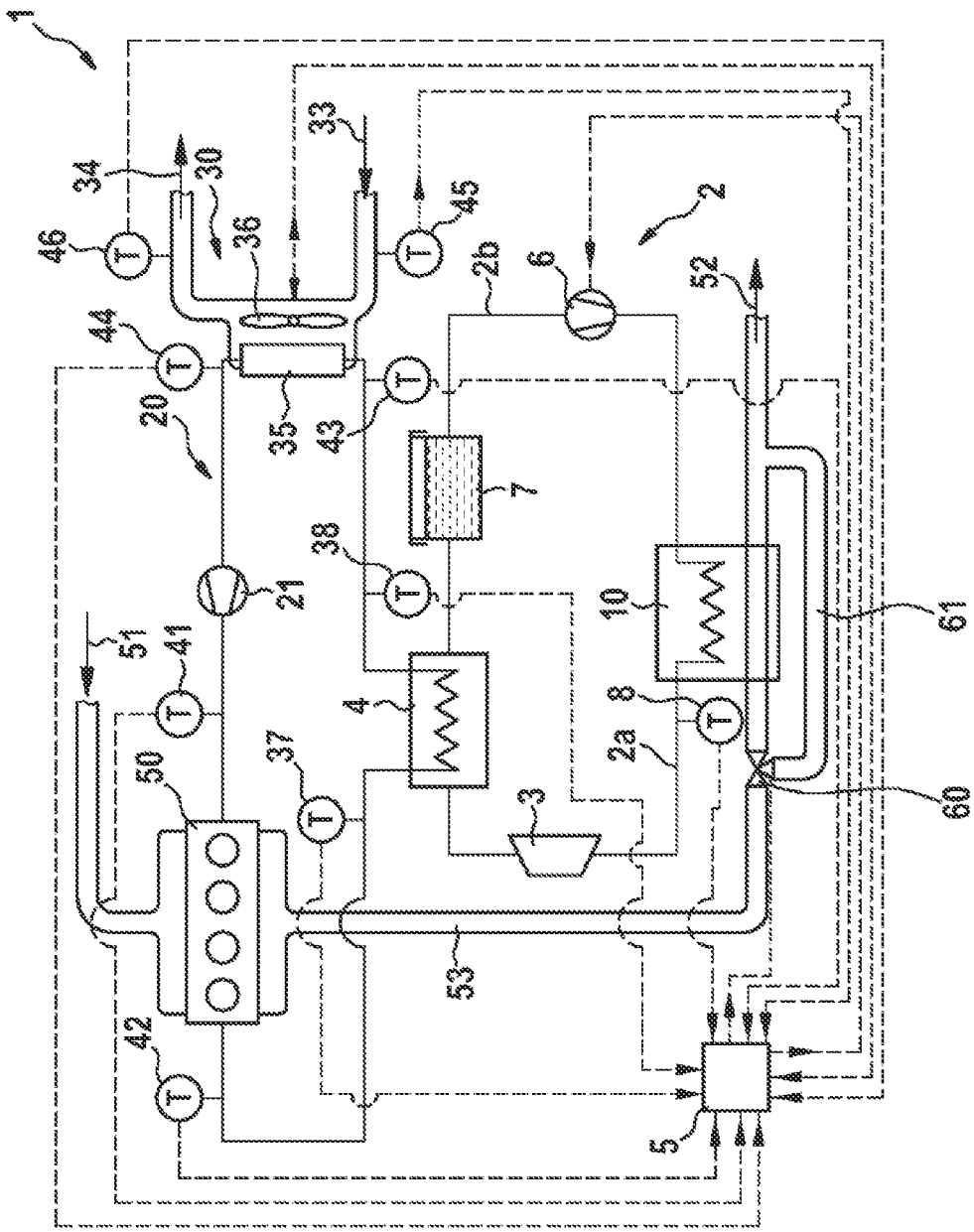
FIG. 1 shows diagrammatically a waste-heat utilization assembly according to the invention of an internal combustion engine, wherein only the essential regions are depicted.

FIG. 1 shows diagrammatically a waste-heat utilization assembly 1 according to the invention, of an internal combustion engine 50, with a working circuit 2 conducting a working medium. The internal combustion engine 50 is arranged in a cooling device or in an engine cooling circuit 20.

On the intake side, the internal combustion engine 50 receives fresh air 51, which may also contain recirculated exhaust gas from the internal combustion engine 50. On the exhaust side, the internal combustion engine 50 has an exhaust gas tract 53, through which the exhaust gas 52 from the internal combustion engine 50 is expelled.

In the flow direction of the working medium, the working circuit 2 comprises a collector tank 7, a feed pump 6, an evaporator 10, an expansion machine 3 and a condenser 4. The collector tank 7 may alternatively be connected to the working circuit 2 via a take-off line and a valve arrangement, or even omitted completely.

The evaporator 10 is furthermore arranged in the exhaust gas tract 53 so that the heat energy of the exhaust gas can be transferred from the exhaust gas tract 53 to the working circuit 2. In the working circuit 2, a temperature sensor 8 is arranged at an outlet from the evaporator 10, in order to determine the outlet temperature of the working medium from the evaporator 10. The temperature sensor 8 is connected to a control unit 5 which regulates the working circuit 2 and the engine cooling circuit 20.

The working circuit 2 can be divided into two regions in the flow direction of the working medium:
- a high-pressure region 2a between the feed pump 6 and the expansion machine 3, and
- a low-pressure region 2b between the expansion machine 3 and the feed pump 6.

An exhaust gas bypass channel 61 is arranged in the exhaust gas tract 53 parallel to the evaporator 10. Furthermore, an exhaust gas bypass valve 60 is arranged in the exhaust gas tract 53 upstream of the evaporator 10, and distributes or controls the exhaust gas mass flow to the evaporator 10 and the exhaust gas bypass channel 61. Alternatively, the exhaust gas bypass valve 60 may also be arranged downstream of the evaporator 10. The exhaust gas bypass valve 60 is here preferably configured either as a switchover valve or as a proportional valve, and is actuated by the control unit 5.

In the flow direction of the coolant, the engine cooling circuit 20 comprises a coolant pump 21, the internal combustion engine 50, the condenser 4, and a cooler 35 with a fan wheel 36, wherein the condenser 4 may be arranged for example between the coolant pump 21 and the internal combustion engine 50. The condenser 4 is thus arranged both in the working circuit 2 and in the cooling device or in the engine cooling circuit 20; in other words, the condenser 4 extracts heat energy from the working circuit 2 and feeds it into the engine cooling circuit 20.

The coolant is cooled in the cooler 35 via the cooler air path 30. The cooler 35 or the fan wheel 36 is fed with cooler intake air 33 in the cooler air path 30; correspondingly, cooler outlet air 34 is transported away from the cooler 35.

According to the invention, temperature sensors for determining the temperature are arranged at various points in the engine cooling circuit 20. Not all temperature sensors described below need be provided, and also only some of these may be used.

A temperature sensor 37 for determining the inlet temperature of the coolant into the condenser 4.

A temperature sensor 38 for determining the outlet temperature of the coolant from the condenser 4.

A temperature sensor 41 for determining the inlet temperature of the coolant into the internal combustion engine 50.

A temperature sensor 42 for determining the outlet temperature of the coolant from the internal combustion engine 50.

A temperature sensor 43 for determining the inlet temperature of the coolant into the cooler 35.

A temperature sensor 44 for determining the outlet temperature of the coolant from the cooler 35.

Optionally, further temperature sensors are arranged in the cooler air path 30 for determining the temperature of the cooler air:

A temperature sensor 45 for determining the temperature of the cooler intake air 33.

A temperature sensor 46 for determining the temperature of the cooler outlet air 34.

The actual arrangement of the temperature sensors also depends on the precise structure of the cooling circuit 20. In the exemplary embodiment of FIG. 1, the temperature sensors 37 and 42 may be combined, since the outlet temperature of the coolant from the internal combustion engine 50 corresponds to the inlet temperature into the condenser 4. Also, the temperature sensors 38 and 43 may be combined, since the outlet temperature of the coolant from the condenser 4 corresponds to the inlet temperature into the cooler 35.

The control unit 5 is connected to the temperature sensors 37, 38, 41, 42, 43, 44, 45, 46 and controls the exhaust gas bypass valve 60, and optionally also the feed pump 6 and fan wheel 36 of the cooler 35, as a function of the signals or temperatures determined by the temperature sensors 37, 38, 41, 42, 43, 44, 45, 46, so as to regulate the temperature of the coolant in the engine cooling circuit 20 and optionally also the temperature of the working medium in the working circuit 2. Optionally, in particular for temperature regulation in the engine cooling circuit 20, the coolant pump 21 may also be actuated by the control unit 5. The exhaust gas bypass valve 60 is controlled such that the maximum temperature of the coolant in the engine cooling circuit 20 is not exceeded.

Furthermore, the data determined at the temperature sensor 8 may also be transmitted to the control unit and hence also used to regulate the engine cooling circuit 20 and working circuit 2.

Figure 2:
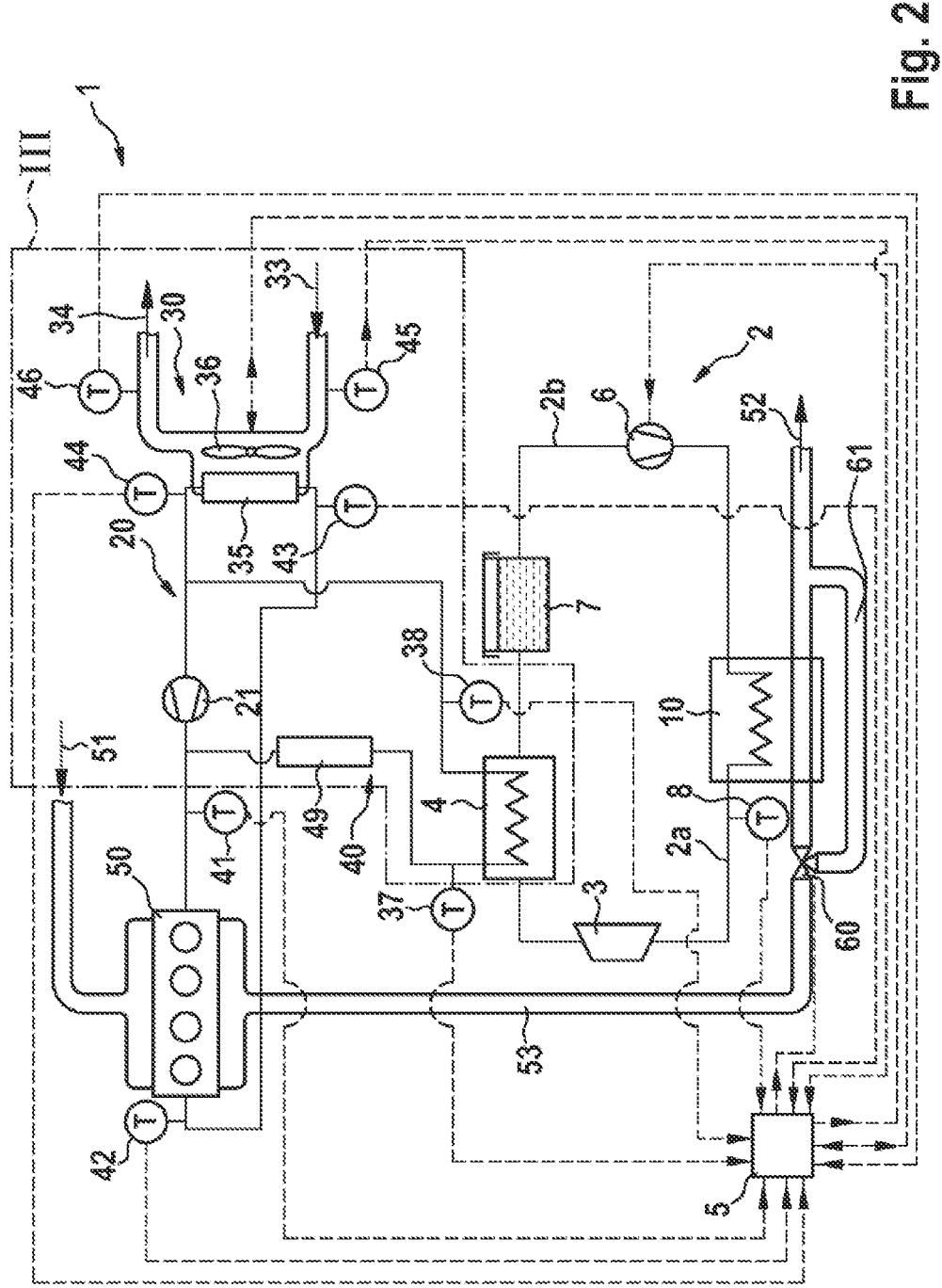
FIG. 2 shows diagrammatically a further waste-heat utilization assembly according to the invention of an internal combustion engine, wherein only the essential regions are depicted.

FIG. 2 shows diagrammatically a further waste-heat utilization assembly 1 of an internal combustion engine 50.

The difference from the embodiment in FIG. 1 is that the condenser 4 is not arranged in the engine cooling circuit 20 but in a further cooling circuit, namely in the condenser cooling circuit 40. In the embodiment of FIG. 2, both the engine cooling circuit 20 and the condenser cooling circuit 40 are fed by the coolant pump 21. Consequently, the same coolant is used in both circuits. In alternative embodiments, the condenser cooling circuit 40 may also be fully decoupled from the engine cooling circuit 20, and consequently have its own feed pump. In such arrangements, different cooling media may then be used for the engine cooling circuit 20 and the condenser cooling circuit 40.

In the embodiment of FIG. 2, the working circuit 2 and cooler air path 30 are constructed similarly to those of FIG. 1. The engine cooling circuit 20 in the embodiment of FIG. 2 differs from that in FIG. 1 in that the condenser 4 is not arranged in the engine cooling circuit 20. In the flow direction of the coolant, the coolant pump 21, a medium cooler 49 and the condenser 4 are arranged in the condenser cooling circuit 40. The medium cooler 49 may here be arranged upstream or downstream of the condenser 4.

In the embodiment of FIG. 2, the temperature sensors 37, 38, 41, 42, 43, 44, 45, 46 may be arranged according to the embodiment of FIG. 1, wherein here arbitrary combinations of some of these temperature sensors are conceivable:

The temperature sensor 37 for determining the inlet temperature of the coolant into the condenser 4.

The temperature sensor 38 for determining the outlet temperature of the coolant from the condenser 4.

The temperature sensor 41 for determining the inlet temperature of the coolant into the internal combustion engine 50.

The temperature sensor 42 for determining the outlet temperature of the coolant from the internal combustion engine 50.

The temperature sensor 43 for determining the inlet temperature of the coolant into the cooler 35.

The temperature sensor 44 for determining the outlet temperature of the coolant from the cooler 35.

The temperature sensor 45 for determining the temperature of the cooler intake air 33.

The temperature sensor 46 for determining the temperature of the cooler outlet air 34.

Figure 3A:
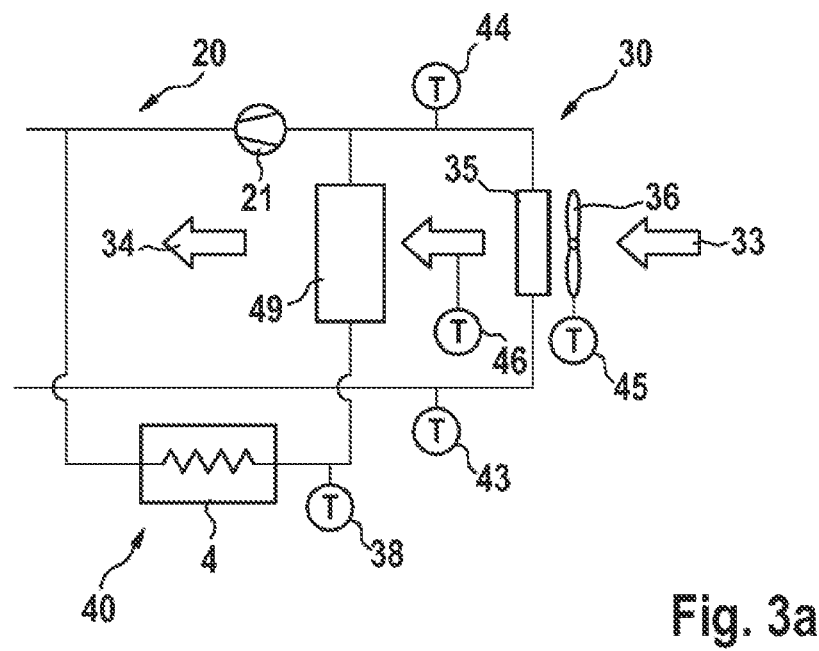
FIGS. 3a and 3b show the extract III from FIG. 2 in further variants.
Figure 3B:
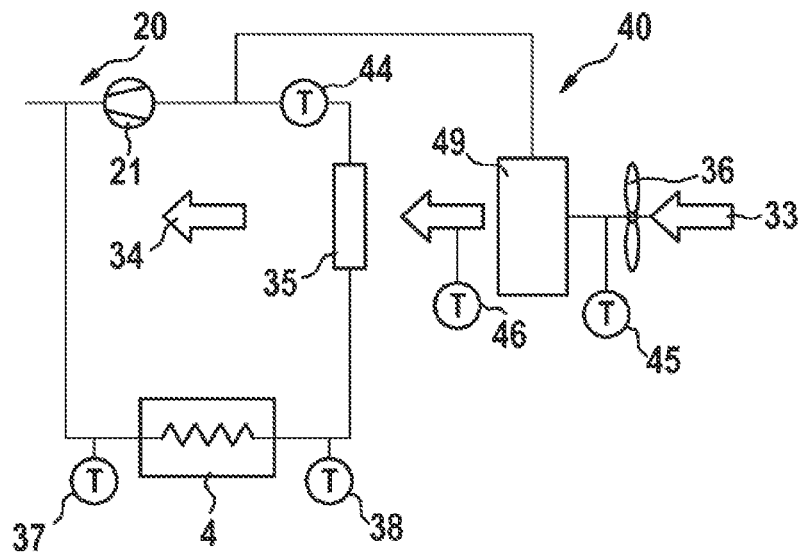

FIGS. 3a and 3b show the extract III from FIG. 2 in further variants. Therefore the description below concerns only the differences from the embodiment of FIG. 2.

FIGS. 3a and 3b show the arrangement of the cooler 35 and the medium cooler 49 in the cooler air path 30. The two variants of FIGS. 3a and 3b differ in the order of the arrangement in the cooler air path 30.

In the embodiment of FIG. 3a, firstly the cooler 35 and then the medium cooler 49 are arranged downstream of the fan wheel 36. In the embodiment of FIG. 3b, firstly the medium cooler 49 and then the cooler 35 are arranged downstream of the fan wheel 36. The common feature of both embodiments is that the rotation of the fan wheel 36 has a decisive influence on the cooling of the engine cooling circuit 20 and condenser cooling circuit 40. The temperature sensors 45, 46 may be placed individually or in any combination in the cooler air path 30, in order to determine the temperature of the cooler air. In this way, a conclusion can be drawn on the efficacy of the cooler 35 and medium cooler 49, and hence indirectly also an overheating of the engine cooling circuit 20 or condenser cooling circuit 40 can be predicted and countered accordingly in good time by actuation of the exhaust gas bypass valve 60.

Figure 4:
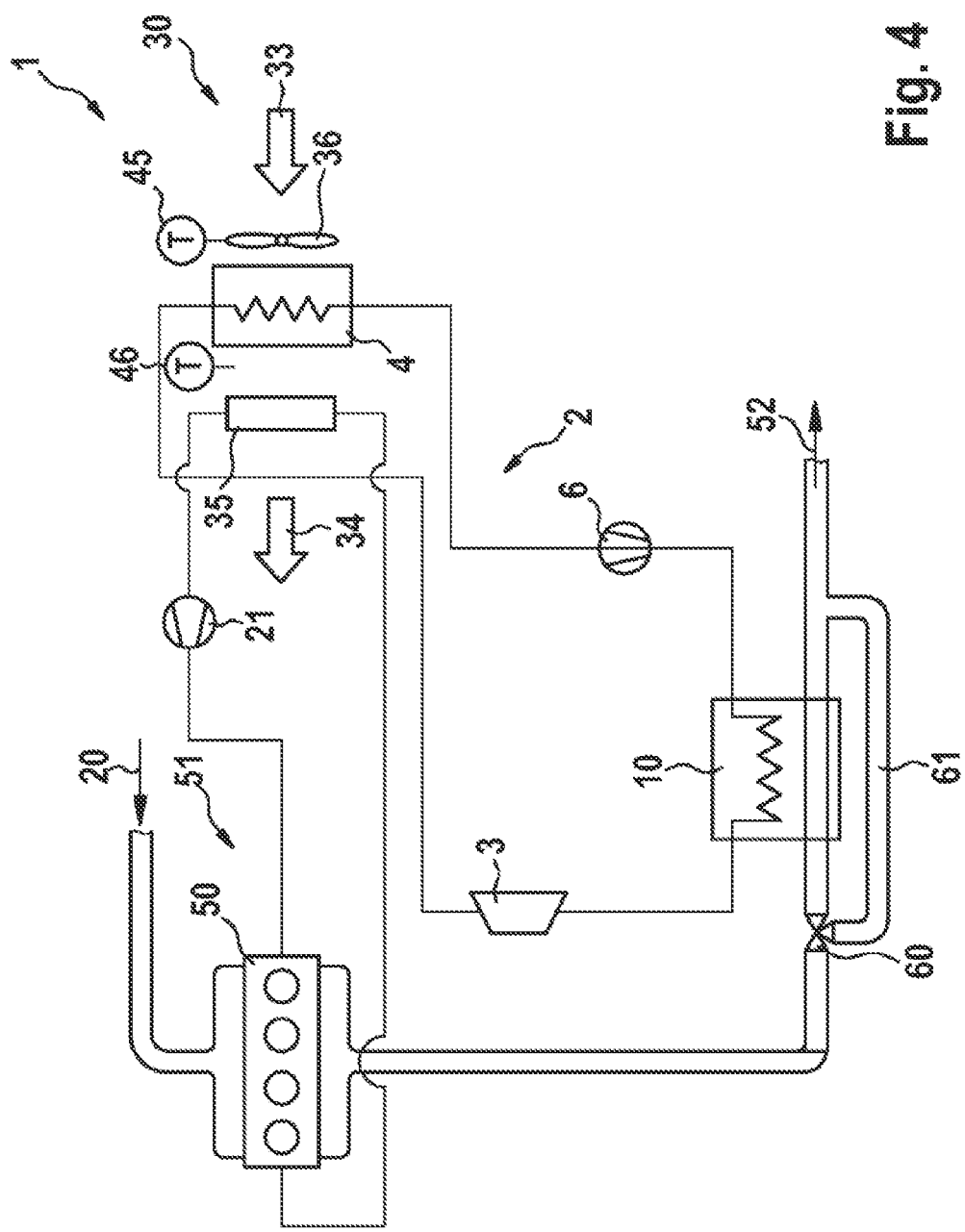
FIG. 4 shows diagrammatically a further waste-heat utilization assembly according to the invention of an internal combustion engine, wherein only the essential regions are depicted.

FIG. 4 shows diagrammatically a further waste-heat utilization assembly 1 of an internal combustion engine 50 in which only the essential regions are depicted. The description below does not concern the constituents of the waste-heat utilization assembly 1 which are common to the previous embodiment. The embodiment of FIG. 4 shows a direct cooling of the condenser 4, preferably as air cooling; the cooling device of this embodiment is therefore the cooler air path 30. For this, the fan wheel 36 of the cooler 35 acts directly on the condenser 4. The cooler intake air 33 flows through the cooler air path 30 because of the rotation of the fan wheel 36. The cooler intake air 33 then hits the condenser 4 and the cooler 35, and is then transported away from the cooler 35 as cooler outlet air 34. Furthermore, a temperature sensor 45 for determining the temperature of the cooler intake air 33, and/or a temperature sensor 46 for determining the temperature of the cooler outlet 34, are arranged in the cooler air path 30.

Preferably, the condenser 4 is indirectly coupled to the cooling circuit 20, namely via the cooler air path 30. Thus the cooler 35 not only cools the condenser 4 but also the internal combustion engine. An increase in temperature of the cooler intake air 33 because of the heat supplied from the condenser 4 may, because of the resulting lower efficiency of the cooler 35, lead to an overheating of the cooling circuit 20 and hence also the internal combustion engine 50. Monitoring of the temperature of the cooler intake air 33 and/or the cooler outlet air 34 thus advantageously serves not only for indirect monitoring of the working circuit 2, but also for monitoring in relation to avoiding an overheating of the cooling circuit 20.

The function of the waste-heat utilization assembly 1 according to the invention is as follows:

The temperature sensors 37, 38, 41, 42, 43, 44, 45, 46 and the temperature sensor 8 transmit data or signals to the control unit 5. Optionally, further sensors may be used both in the working circuit 2 and in the engine cooling circuit 20, and in the exhaust gas tract 53, in order to regulate the working circuit 2 and/or the engine cooling circuit 20 or cooler air path 30 more precisely and efficiently, and in some cases more quickly. The control unit 5 may also be fed with further data: for example, a load or operating point of the internal combustion engine 50 within a map, exhaust gas mass flows in the exhaust gas tract 53, exhaust gas temperatures in the exhaust gas tract 53, or also a predictive road profile or load profile for the internal combustion engine 50. All these data may consequently be used to control the waste-heat utilization assembly 1.

The exhaust gas bypass channel 61 is arranged parallel to the evaporator 10 in order to conduct exhaust gas past the evaporator 10 where necessary. This avoids excessive pressures and/or temperatures in the working circuit 2 and/or in the engine cooling circuit 20 and/or in the condenser cooling circuit 40 and/or in the cooler air path 30. This prevents an overload or rapid wear of the components of the waste-heat utilization assembly 1, so that the service life of the entire waste-heat utilization assembly 1 is extended. Also, however, evaporation of the coolant due to excessive temperatures can be avoided.

Advantageously, for this the control unit 5 actuates the exhaust gas bypass valve 60 and thus distributes the exhaust gas mass flow to the evaporator 10 and the exhaust gas bypass channel 61. In addition, the control unit 5 may also actuate the feed pump 6 in order to regulate the mass flow of the working medium through the working circuit 2.

In operation of the waste-heat utilization assembly 1, situations may arise in which, due to the heat input from the working circuit 2 into the engine cooling circuit 20 or condenser cooling circuit 40 or cooler air path 30, the temperature of the coolant rises significantly before the cooler 35 or in the condenser cooling circuit 40, or the temperature of the cooler air rises, as determined by the temperature sensor 43 or by one of the temperature sensors 37 or 38, or by the temperature sensor 46. As a result, the fan wheel 36 must be brought into operation earlier than in other operating states, else the condenser cooling circuit 40 or also the engine cooling circuit 20 will overheat. As a result, the overall efficiency of the internal combustion engine 50 and waste-heat utilization assembly 1 may be reduced. Analysis of the signals from the temperature sensors 37, 38, 41, 42, 43, 44, 45, 46 (or some of these) may allow early detection of such an operating situation, and the exhaust gas bypass valve 60 can be actuated to prevent overheating of the engine cooling circuit 20 and/or the condenser cooling circuit 40 and/or the cooler air path 30.

In a refinement of the method, the control unit 5 detects if the fan wheel 36 is rotating. Accordingly, the waste gas stream to the evaporator 10 can be reduced or even suppressed in good time by the exhaust gas bypass valve 60. In this way for example, a forced choking of the internal combustion engine 50 can be prevented.

In a further operating situation, despite a high mass flow of coolant, the cooling power of the cooler 35 or medium cooler 49 is not sufficient to limit the temperature and hence also the pressure in the engine cooling circuit 20 or condenser cooling circuit 40. In the extreme case, the power of the internal combustion engine 50 must be reduced accordingly. In order to prevent this in good time, the exhaust gas bypass valve 60 is actuated accordingly, depending on the data determined by the temperature sensors 37, 38, 41, 42, 43, 44, 45, 46 arranged in the engine cooling circuit 20 or condenser cooling circuit 40 or cooler air path 30.

The invention claimed is:

1. A waste-heat utilization assembly of an internal combustion engine, the waste-heat utilization assembly comprising:
   a control unit; and
   a working circuit configured to conduct a working medium;
   wherein the working medium flows in a direction through a feed pump, an evaporator, an expansion machine and a condenser arranged in the working circuit;
   wherein the evaporator is also arranged in an exhaust gas tract of the internal combustion engine;
   wherein an exhaust gas bypass channel is arranged in the exhaust gas tract parallel to the evaporator;
   wherein an exhaust gas bypass valve is configured to control a distribution of a mass flow of the exhaust gas of the internal combustion engine to the evaporator and to the exhaust gas bypass channel;
   wherein the waste-heat utilization assembly also comprises a cooling device configured to conduct a coolant;
   wherein the condenser is arranged in the cooling device,
   wherein a temperature sensor is arranged in the cooling device and is configured to measure an actual temperature; and
   wherein the control unit controls the exhaust gas bypass valve to have the actual temperature measured in the cooling device be less than or equal to a predetermined maximum temperature.

2. The waste-heat utilization assembly as claimed in claim 1, wherein the cooling device includes an engine cooling circuit that includes a coolant pump and at least one cooler.

3. The waste-heat utilization assembly as claimed in claim 2, wherein the internal combustion engine is arranged in the engine cooling circuit.

4. The waste-heat utilization assembly as claimed in claim 2, wherein the temperature sensor is arranged upstream of the condenser in the engine cooling circuit.

5. The waste-heat utilization assembly as claimed in claim 4, further comprising at least an additional temperature sensor arranged downstream of the condenser in the engine cooling circuit.

6. The waste-heat utilization assembly as claimed in claim 2, wherein the at least one cooler is furthermore arranged in a cooler air path;
   wherein the cooler air path comprises an additional temperature sensor.

7. The waste-heat utilization assembly as claimed in claim 2, further comprising at least an additional temperature sensor is arranged downstream of the condenser in the engine cooling circuit.

8. The waste-heat utilization assembly as claimed in claim 1, wherein the cooling device includes a cooler air path that includes at least one cooler.

9. The waste-heat utilization assembly as claimed in claim 8, wherein the temperature sensor is arranged upstream of the condenser in the cooler air path.

10. The waste-heat utilization assembly as claimed in claim 9, further comprising an additional temperature sensor arranged downstream of the condenser in the cooler air path.

11. The waste-heat utilization assembly as claimed in claim 8, further comprising an additional temperature sensor arranged downstream of the condenser in the cooler air path.

12. A method for operating a waste-heat utilization assembly of an internal combustion engine, the waste-heat utilization assembly having:
    a working circuit conducting a working medium;
    wherein the working medium flows in a direction through a feed pump, an evaporator, an expansion machine and a condenser that are arranged in the working circuit;
    wherein the evaporator is also arranged in an exhaust gas tract of the internal combustion engine;
    wherein an exhaust gas bypass channel is arranged in the exhaust gas tract parallel to the evaporator;
    wherein an exhaust gas bypass valve distributes the exhaust gas mass flow to the evaporator and to the exhaust gas bypass channel;
    wherein the waste-heat utilization assembly also comprises a cooling device to conduct a coolant;
    wherein the condenser and a temperature sensor are arranged in the cooling device, the temperature sensor measuring an actual temperature,
    the method comprising:
    controlling the exhaust gas bypass valve with a control unit to have the actual temperature be less than or equal to a predetermined maximum temperature.

13. The method as claimed in claim 12, wherein the method further comprises providing the cooling device with at least one cooler and a cooler air path.

14. The method as claimed in claim 13, further comprising:
    providing a fan wheel positioned near the at least one cooler;
    detecting an actual rotation of the fan wheel via the control unit and
    actuating the exhaust gas bypass valve based on the actual rotation of the fan wheel.

15. The method as claimed in claim 12, wherein the method further comprises providing a coolant pump and at least one cooler positioned in the cooling device.

16. The method as claimed in claim 15, further comprising:
    arranging the cooler in a cooler air path,
    positioning an additional temperature sensor the cooler air path for transmitting actual signals to the control unit and
    actuating the exhaust gas bypass valve with the control unit based on the actual temperature and based on the actual signals from the additional temperature sensor.

17. The method as claimed in claim 12, further comprising:
    controlling the exhaust gas bypass valve using a map of operating states of the internal combustion engine that is stored in the control unit (5).

* * * * *